(12) United States Patent  (10) Patent No.: US 8,355,961 B1
Ng et al.  (45) Date of Patent: Jan. 15, 2013

(54) DISTRIBUTION CENTER HEAD-UP DISPLAY

(75) Inventors: Sei Y. Ng, Olathe, KS (US); Carl J. Persson, Olathe, KS (US); Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 913 days.

(21) Appl. No.: 11/833,758

(22) Filed: Aug. 3, 2007

(51) Int. Cl.
*G06Q 10/00* (2006.01)
(52) U.S. Cl. ............... 705/28; 705/26.9; 705/26.64
(58) Field of Classification Search ............ 340/539.13; 342/357.13; 396/56; 701/211; 705/28
See application file for complete search history.

(56) References Cited

U.S. PATENT DOCUMENTS

| | | | |
|---|---|---|---|
| 3,848,974 A | | 11/1974 | Hosking et al. |
| 6,452,544 B1 | * | 9/2002 | Hakala et al. ............ 342/357.31 |
| 6,526,352 B1 | * | 2/2003 | Breed et al. .................. 701/470 |
| 6,900,731 B2 | * | 5/2005 | Kreiner et al. ............. 340/572.1 |
| 7,091,852 B2 | | 8/2006 | Mason et al. |
| 7,139,637 B1 | * | 11/2006 | Waddington et al. ......... 700/216 |
| 7,245,216 B2 | | 7/2007 | Burkley et al. |
| 7,305,102 B2 | * | 12/2007 | Nagasaki ...................... 382/100 |
| 7,908,556 B2 | | 3/2011 | Shamma et al. |
| 8,055,296 B1 | | 11/2011 | Persson et al. |
| 8,264,422 B1 | | 9/2012 | Persson et al. |
| 2003/0064718 A1 | | 4/2003 | Haines et al. |
| 2003/0076980 A1 | | 4/2003 | Zhang et al. |
| 2003/0206099 A1 | | 11/2003 | Richman |
| 2003/0222892 A1 | * | 12/2003 | Diamond et al. ............ 345/647 |
| 2004/0082341 A1 | | 4/2004 | Stanforth |
| 2005/0048918 A1 | | 3/2005 | Frost et al. |
| 2005/0068171 A1 | | 3/2005 | Kelliher et al. |
| 2005/0090201 A1 | | 4/2005 | Lengies et al. |
| 2005/0093976 A1 | | 5/2005 | Valleriano et al. |
| 2005/0137786 A1 | * | 6/2005 | Breed et al. .................... 701/200 |
| 2005/0181806 A1 | | 8/2005 | Dowling et al. |
| 2005/0200478 A1 | * | 9/2005 | Koch et al. ............... 340/539.13 |
| 2006/0024627 A1 | | 2/2006 | Platts |
| 2006/0079187 A1 | * | 4/2006 | Struck .......................... 455/90.2 |
| 2006/0103590 A1 | | 5/2006 | Divon |
| 2006/0158329 A1 | | 7/2006 | Burkley et al. |
| 2007/0036100 A1 | | 2/2007 | Shaffer et al. |
| 2007/0067104 A1 | * | 3/2007 | Mays ............................ 701/211 |
| 2007/0086764 A1 | * | 4/2007 | Konicek ......................... 396/56 |
| 2007/0132663 A1 | | 6/2007 | Iba et al. |
| 2007/0173266 A1 | | 7/2007 | Barnes |
| 2007/0220108 A1 | * | 9/2007 | Whitaker ..................... 709/217 |
| 2008/0055194 A1 | | 3/2008 | Baudino et al. |
| 2008/0088527 A1 | | 4/2008 | Fujimori et al. |
| 2008/0089587 A1 | * | 4/2008 | Kim et al. .................... 382/190 |

(Continued)

OTHER PUBLICATIONS

Persson, Carl J., et al., "Head-up Security Display", filed Aug. 3, 2007, U.S. Appl. No. 11/833,747.

(Continued)

*Primary Examiner* — Scott Zare
*Assistant Examiner* — Talia Crawley

(57) ABSTRACT

A system is provided for determining an item location in a distribution center. The system includes an audio device, a transparent display, and a mobile device in communication with the audio device and the transparent display. The mobile device receives a request to determine item location from the audio device, determines a location of the mobile device, and determines an item location. The mobile device also outputs item location information to the transparent display and outputs additional information to the transparent display in response to a change of the location of the mobile device.

20 Claims, 7 Drawing Sheets

U.S. PATENT DOCUMENTS

| | | | |
|---|---|---|---|
| 2008/0215202 A1* | 9/2008 | Breed | 701/25 |
| 2009/0011799 A1 | 1/2009 | Douthitt et al. | |
| 2009/0322881 A1 | 12/2009 | Shu et al. | |
| 2010/0029296 A1 | 2/2010 | Noonan et al. | |

OTHER PUBLICATIONS

Advisory Action dated Apr. 22, 2011, U.S. Appl. No. 11/936,074.

Notice of Allowance dated Jun. 23, 2011, U.S. Appl. No. 11/936,074.

Office Action Restriction dated Aug. 16, 2011, U.S. Appl. No. 11/833,747.

Office Action dated Aug. 22, 2011, U.S. Appl. No. 11/937,488.

Office Action dated Sep. 23, 2011, U.S. Appl. No. 11/833,747, filed Aug. 3, 2007.

Office Action dated Jan. 20, 2012, U.S. Appl. No. 11/833,747, filed Aug. 3, 2007.

Office Action dated Jan. 27, 2012, U.S. Appl. No. 11/937,488, filed Nov. 8, 2007.

Notice of Allowance dated May 4, 2012, U.S. Appl. No. 11/937,488, filed Nov. 8, 2007.

Advisory Action dated Jun. 27, 2012, U.S. Appl. No. 11/833,747, filed Aug. 3, 2007.

Final Office Action dated Feb. 2, 2011, U.S. Appl. No. 11/936,074.

Office Action dated Aug. 16, 2010, U.S. Appl. No. 11/936,074 (11 pgs.).

Persson, Carl J., et al., "Head-up Display Communication System and Method", filed Nov. 6, 2007, U.S. Appl. No. 11/936,074.

Persson, Carl J., et al., "Safe Head-up Display of Information", filed Nov. 8, 2007, U.S. Appl. No. 11/937,488.

Office Action dated Jul. 12, 2010, U.S. Appl. No. 11/936,074 (6 pgs.).

* cited by examiner

DISTRIBUTION CENTER HEAD-UP DISPLAY

CROSS-REFERENCE TO RELATED APPLICATIONS

This nonprovisional patent application is related to concurrently filed U.S. patent application Ser. No. 11/833,747, titled "Head-up Security Display," by Carl J. Persson, et al, which is herein incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Distribution centers incur significant expenses training workers to store and retrieve items. Even after training, storage and retrieval mistakes are common. Workers can use mobile devices to identify an item location, such as the location where an item should be stored or the location where the item should be retrieved. However, these mobile devices can be inefficient because they require the use of at least one of the worker's hands and may also require the worker to look away from the item to be stored or retrieved. Additionally, the inventory of items stocked can change between the time a worker initially begins retrieving items and the time the worker actually arrives at a specific location in the distribution center or warehouse to retrieve a specific item. Reporting out of stock items during a hectic retrieval process can lead to errors.

SUMMARY

In some embodiments, a system is provided for determining an item location in a distribution center. The system includes a mobile device in communication with an audio device and a transparent display. The audio device requests the mobile device to determine an item location. The mobile device determines a location of the mobile device and determines the item location. The mobile device also outputs the item location information to the transparent display and outputs additional information to the transparent display in response to a change of the location of the mobile device.

In other embodiments, a method is provided for determining an item location in a distribution center. A request is received to determine the item location. A location of the mobile device is determined. Item location information is output via the mobile device based on the location of the mobile device. Additional item location information is output via the mobile device in response to a change of the location of the mobile device.

In still other embodiments, a method is provided for determining an item location in a distribution center. A request is received via a mobile device to determine the item location. The location of the mobile device is determined. The item location is determined. Item location information is output to a transparent display via the mobile device. The item location information is based on the item location relative to the location of the mobile device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, methods and systems are provided for determining an item location in a distribution center, which can be a warehouse, a grocery store, or a similar environment. The system includes a mobile device in communication with an audio device and a transparent display. A mobile device user can orally submit a request to determine an item location through the audio device, leaving the user's hands free for other tasks. The mobile device determines the location of the requested item and outputs item location information to the transparent display. The transparent display can project images on a lens worn by the user, such that the user does not have to look down or away from items in the distribution center to see the item location information.

The mobile device can identify a requested item by using an electronic tag reader operable to identify or read electronic tags associated with the item. In other embodiments, the mobile device can also identify the requested item by using a camera to capture an image of the item. The item location information can be based on the item location relative to the location of the mobile device, such that the mobile device displays the most efficient route and order for storing and retrieving items by the user. As the user moves through the distribution center, the mobile device can output customized item location information based on the change of the mobile device's location to assist the user in arriving at the item location. The item location information can include a map that identifies the item location and other menu options that the user can select orally. The mobile device can convert the item location information to audio signals and output the signals to the audio device, thereby providing audio information that the user may select to supplement the visual information. Because the outputs to the transparent display and the audio device can be translated into any required language, users who understand and read a variety of languages can function efficiently without the need to label boxes or items in multiple languages.

Figure 1:
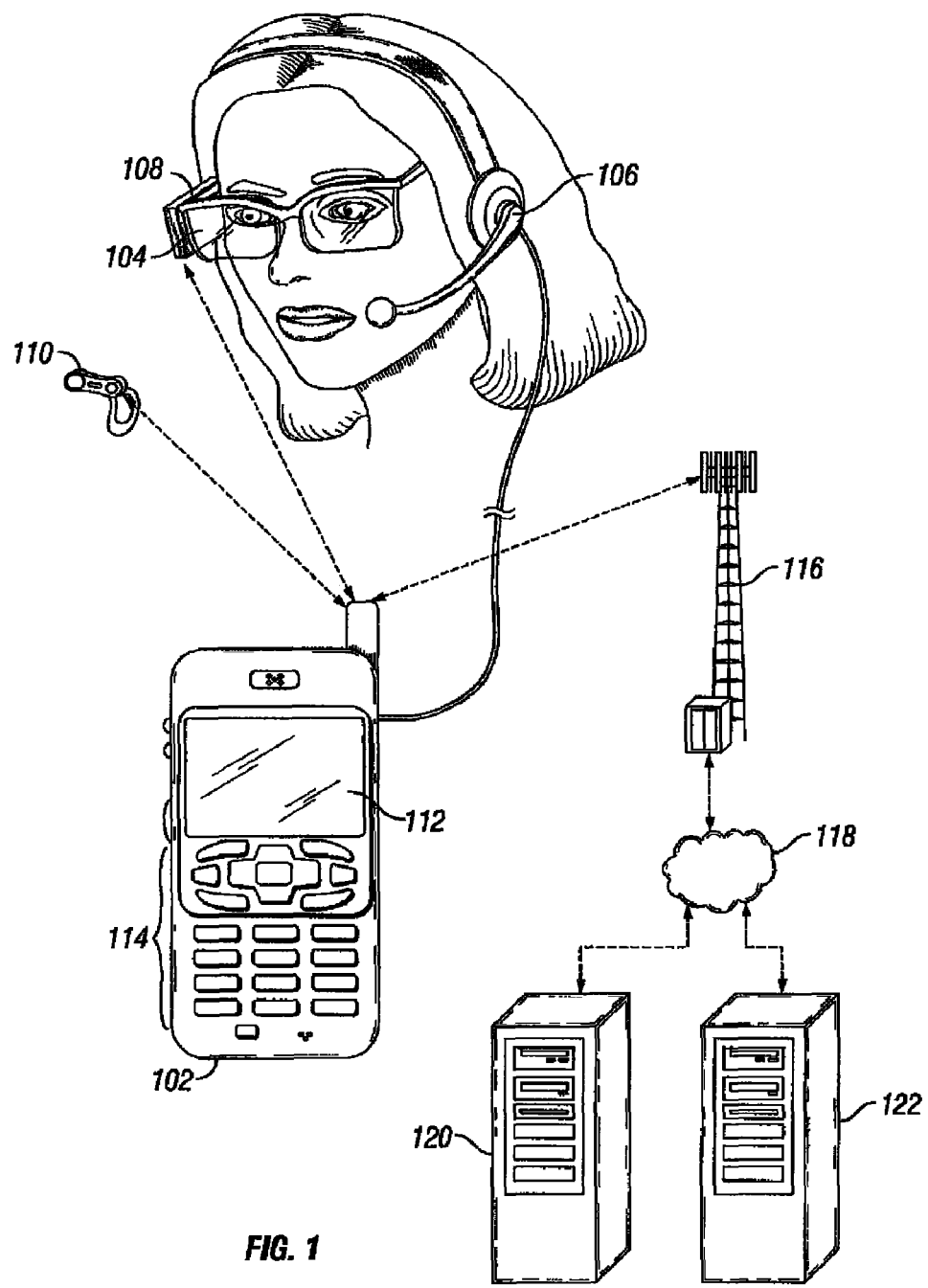
FIG. 1 shows an illustrative wireless communications system for determining an item location in a distribution center.

FIG. 1 shows a wireless communications system 100 that illustrates the context for the present disclosure's systems and methods. The wireless communication system 100 includes an illustrative mobile device 102. Though illustrated as a mobile phone, the mobile device 102 may take various forms including a personal digital assistant (PDA), a mobile computer, a digital camera, a mobile phone or mobile communications device, and a digital music player. Many suitable mobile devices combine some or all of these functions.

The mobile device 102 can communicate with a transparent display 104 and an audio device 106. The transparent display 104, which can function as a distribution center head-up display, includes a user wearable lens and a projector 108 to project images on the lens. The mobile device 102 can output content to the transparent display 104 that is projected as virtual images on the lens. The virtual or see-through images overlay the user's view of reality. The mobile device 102 can also project the content to the transparent display's 104 side panes that the user can conveniently view without any head movement by the user. The audio device 106 includes a microphone to input the user's audio signals and a speaker to output audio signals to the user. The audio device 106 may be a headset, an earpiece with a microphone, or any similar device that combines a speaker with a microphone. The mobile device 102 can also communicate with a camera 110 that can capture images of items viewed through the transparent display 104. Because the camera 110 can be located near the transparent display's 104 projector 108, the camera 110 can provide feedback to the mobile device 102 regarding what the user can see. The camera feedback can include the viewer's orientation, such as facing due north in a warehouse aisle that is oriented from south to north.

The mobile device 102 includes a display 112 and a touch-sensitive surface or keys 114 with which the user can also interact. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction, such as determining an item location.

In the illustrative system 100, the mobile device 102 communicates through a cell tower 116 and a wired or wireless network 118 to access information on various servers, such as a communication server 120 and a content server 122. While one cell tower is shown in FIG. 1, other cell towers could be present. The mobile device 102 may also communicate through wireless access points to the content server 122. The content server 122 may provide content that may be shown on the transparent display 104. The content server 122 can include a database for items that can be stored in a distribution center, locations in the distribution center, and applications that can promote determining item locations in the distribution center.

Figure 2:
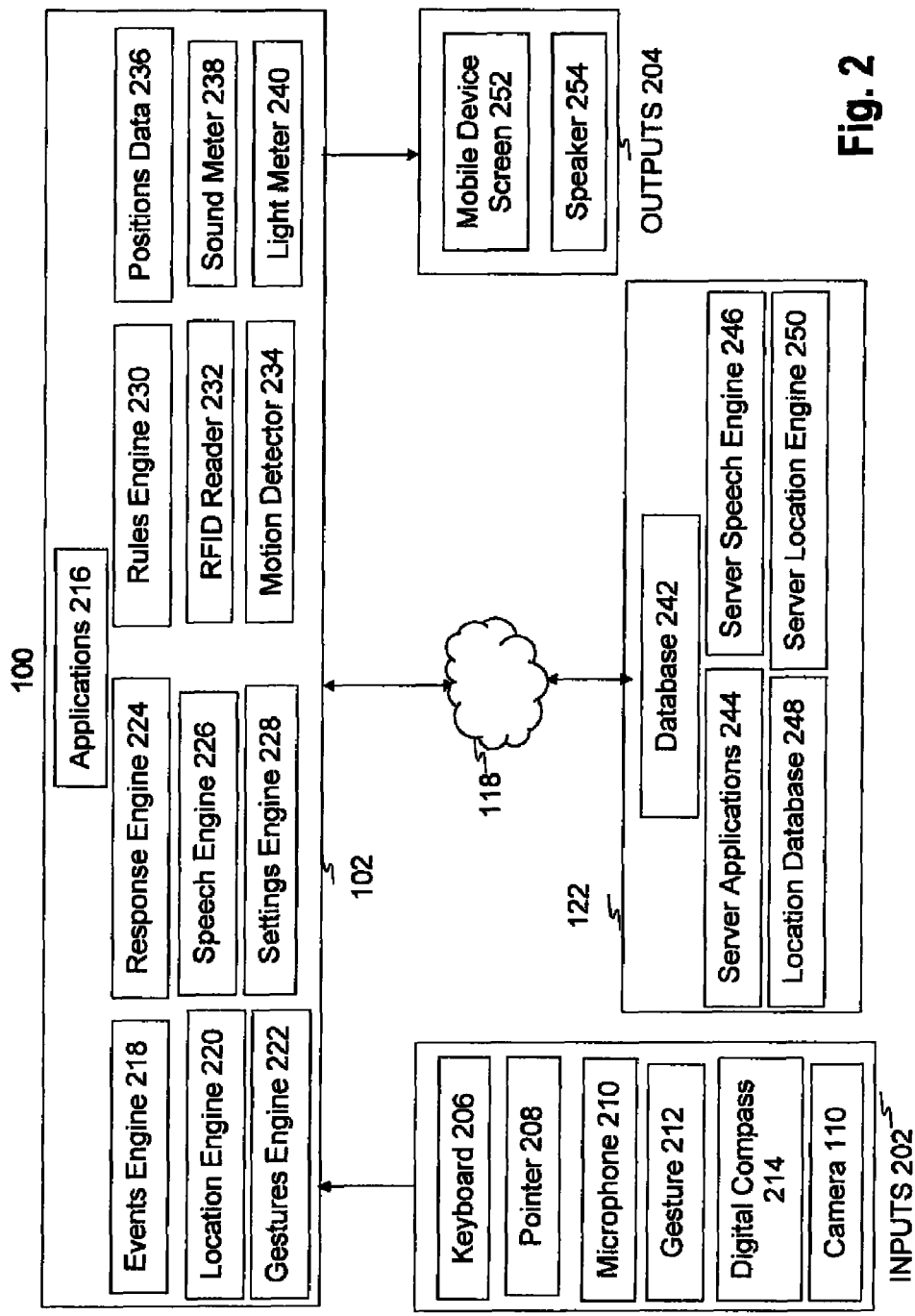
FIG. 2 shows a block diagram of an illustrative wireless communications system for determining an item location in a distribution center.

FIG. 2 is a block diagram illustrating the wireless communications system 100 for determining an item location in a distribution center according to some embodiments of the present disclosure. The system includes inputs 202 to and outputs 204 from the mobile device 102. The inputs 202 can be via a keyboard 206, a pointer 208, a microphone 210, a gesture 212 input, a digital compass 214, and the camera 110. For example, a supervisor of the user can enter a text message via the keyboard 206, which can be a computer keyboard in communication with the content server 122. The text message can be communicated to the mobile device 102, and projected on the transparent display 104 or output as an audio signal via the audio device 106. Additionally, the supervisor can select messages through the pointer 208, which can be a computer mouse or similar input device in communication with the content server 122. The user can speak into the microphone 210 on the audio device 106 to request the mobile device 102 to determine the location of an item in the distribution center.

The user can enter a gesture 212 input to the mobile device 102 by aligning the user's finger with an option projected on the transparent display 104. The camera 110 captures an image, for example, of the finger and its location, which can be identified as aligned with the option projected on the transparent display 104. The mobile device 102 can process the gesture 212 input by executing the option selected by the user's finger. The digital compass 214 is on the transparent display 104, and is a multi-axis sensor that can determine not only the heading, but also the roll and the pitch for the transparent display 104. The digital compass 214 inputs information to the mobile device 102 to identify the transparent display's 104 orientation, and hence the view of the user. For example, if the user's head is facing directly north-east, directly toward the horizon, and without any tilt, the digital compass 214 inputs the orientation to the mobile device 102. The orientation information enables the mobile device 102 to project images on the transparent display 104 as transparent overlays on items whose images are captured by the camera 110. For example, when the user is looking for a specific item in the distribution center, the camera 110 can capture an image of the item that is recognized by the mobile device 102. The mobile device 102 can respond by outputting a transparent overlay on the transparent display 104, based on the orientation information, which identifies the specific item to the user. An example of a transparent overlay projected on the transparent display 104 is described below in reference to FIG. 5.

The mobile device 102 can include components 216 to 240 that can assist a user in determining an item location. The components 216 to 240 can include applications 216, an event engine 218, a location engine 220, a gestures engine 222, a response engine 224, a speech engine 226, a settings engine 228, a rules engine 230, a radio frequency identifier (RFID) reader 232, a motion detector 234, positions data 236, a sound meter 238, and a light meter 240. The applications 216 can provide interfaces between the mobile device 102, the inputs 202, the outputs 204, and the content server 122. The events engine 218 can determine when to send some of the outputs 204 based on periodic events, such as an hourly text message of the user's work efficiency relative to efficiency goals. The location engine 220 can promote inputting a request for an item location, determining the item location, and outputting item location information. The location engine 220 can also store item location information. The gestures engine 222 can recognize the significance of the gesture 212 input as captured by the camera 110 and determine the response to the gesture 212 input.

The response engine 224 can execute the appropriate response for a gesture 212 input or other inputs 202. The speech engine 226 can convert audio signals input via the microphone 210 on the audio device 106 and execute speech recognition software to determine the appropriate response to the audio signal. For example, when the user says "status," the microphone 210 inputs this audio signal and the speech engine converts the audio signal to a request to project the user's status for the current day. The speech engine 226 can also execute speech recognition software to convert audio information to text, such as converting oral comments recorded by one mobile device user to text projected on the transparent display of another mobile device user. The settings engine 228 can keep track of settings for the mobile device 102, such as the intensity of images projected on the transparent display 104 and whether speech input is enabled.

The rules engine 230 can specify the procedure used in determining item location, such as referencing the location engine 220 on the mobile device 102 before accessing any location database located elsewhere. The RFID reader 232 is an electronic tag reader that can detect a RFID signal from an item's RFID tag and determine the item's identity based on the RFID signal. The RFID reader 232 can be used to associate any additional information with the RFID tag of the item. The RFID reader 232 does not have to identify the serial number of a specific requested item, because the RFID reader 232 can identify the location of many instances of the requested item based on the RFID tag for any of the instances. For example, the RFID reader 232 can identify where many particular models of a flat screen televisions are located without having to identify a unique serial number for any of the televisions. Because items in the distribution center can be identified based on images of the items captured by the camera 110 or based on RFID tags, the items in the distribution center may not require text labels to be identified. Confidential items may not have to be labeled with text, such that the mobile device 102 identifies the confidential items only for workers with a specific security clearance. The motion detector 234 can function as a pedometer to assist in determining the location of the mobile device 102 as the user walks in the distribution center.

The positions data 236 can assist the mobile device 102 in determining item location information based on the position of the requested item relative to the position of the mobile device 102 and the position of any fixed locations in the distribution center. The sound meter 238 can evaluate the audio signal via the microphone 210 to determine when background sounds are so loud that the speech engine 226 will have difficulty with speech recognition or the user will have difficulty hearing outputs via the audio device 106. The light meter 240 can evaluate the distribution center's light via the camera 110 to determine when the light is so bright that the camera 110 will have difficulty identifying items, images, and gestures, or the user will have difficulty viewing outputs via the transparent display 104.

The content server 122 can include a database 242, server applications 244, a server speech engine 246, a location database 248, and a server location engine 250 to assist the mobile device 102 in determining an item location. The database 242 can store captured images of stored items to assist the user of the mobile device 102 to identify an item as the requested item. The server application 244 can provide interfaces between the mobile device 102 and the content server 122.

The server speech engine 246 can convert audio signals input via the microphone 210 and execute speech recognition software to determine the appropriate response to the audio signal. The locations database 248 can store item location information. The server location engine 250 can input a request for an item location, determine the item location, and output item location information. The functions of recognizing speech, storing item location information, and determining item location can be implemented on the mobile device 102, the content server 122, or a combination of the mobile device 102 and the content server 122. The location of various components in FIG. 2 are depicted as illustrative examples only because some of the components 216 to 240 can be implemented on the content server 122 and some of the components 242 to 250 can be implemented on the mobile device 102.

The outputs 204 include a mobile device screen 252 and a speaker 254. The mobile device screen 252 is the graphic output for the transparent display 104. The speaker 254 is the audio output for the audio device 106.

Figure 3:
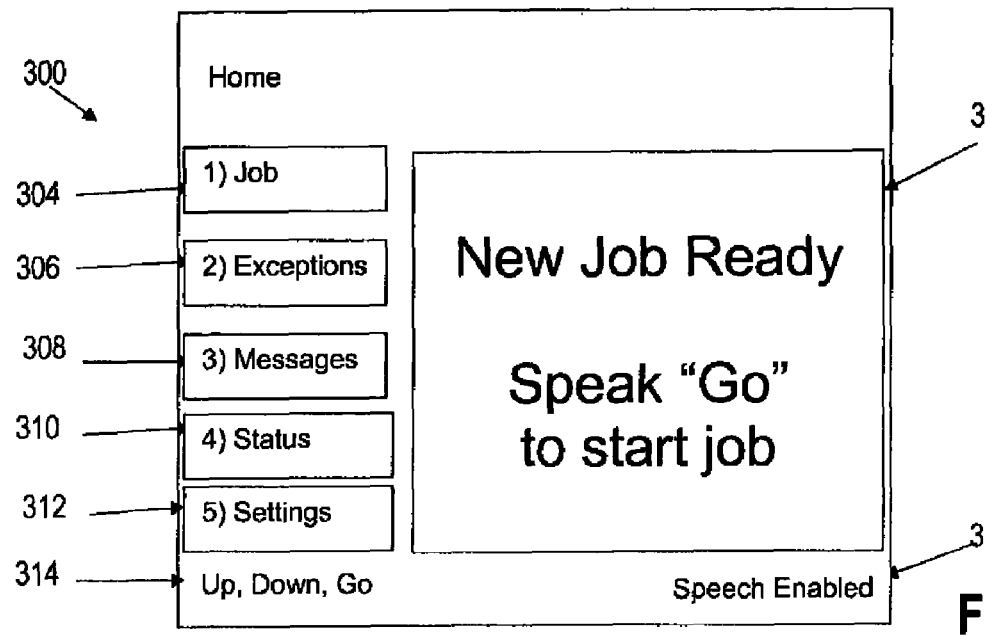
FIG. 3 shows a graphic user interface for determining an item location in a distribution center according to some embodiments of the present disclosure.

FIG. 3 shows a graphic user interface 300 for determining an item location in a distribution center according to some embodiments of the present disclosure. The graphic user interface 300 is projected on the transparent display 104, and can include a text output 302, input options 304 to 312, an input prompt 314, and a communication status 316. For example, the output 302 can be a text message "New job ready, speak 'go' to start job" that informs the user of a specific spoken command that initiates a specific response. The audio device 106 can detect the user speaking the word "go," and the mobile device 102 can respond to this spoken command by sending a new output to the transparent display 104, with the new output including item location information.

The input options 304 to 312 can include "1) job" 304, "2) exceptions" 306, "3) messages" 308, "4) status" 310, and "5) settings" 312. Each input option can be a text command preceded by a reference numeral, such that the text command can be initiated by either speaking the text command or by speaking the preceding reference numeral that corresponds to the text command. For example, if the user speaks the word "messages" or the reference numeral "3" that corresponds to the text command "messages," the mobile device 102 responds by projecting a supervisor's text message sent to the user as a text output on the transparent display 104.

The input option "1) job" 304 enables the user to select item location information for specific items listed in a job or task. For example, after retrieving an item the user can select the projection of item location information for a subsequent item listed in the same job or task. The mobile device 102 can determine the most efficient order for retrieving or storing items and the most efficient route through the distribution center for retrieving or storing items. The input option "2) exceptions" 306 enables the user to report an exception at an item location, such as reporting that an item is out of stock at the location identified as the item location. Such oral reporting of an out of stock item makes reporting more convenient for the user, thereby reducing the possibility that the user forgets to report the out of stock item. Reporting an out of stock item can result in a request to restock the item within a specified timeframe, or a request to delay the order that contains the out of stock item if restocking within the specified timeframe is not possible. The input option "3) messages" 308 enables the user to send and receive messages to other distribution system workers. Examples of the messages include "this box is getting low," "a box spilled on the floor on the north end of aisle 5," or "all hands meeting at 1:00." The input option "4) status" 310 enables the user to request performance information, such as how many items the user has stored and retrieved that day, and how the user's work rate compares to other workers' work rates and the user's work rate goal. The input option "5) settings 312" enables the user to view and modify system settings, such as enabling speech input and selecting lighter or darker display settings than the mobile device 102 automatically selects based on the light meter 240.

The input prompt 314 projects additional commands that the user can submit orally, such as "up, down, go." For example, after the user has spoken "messages," the text output 302 projects a message from the user's supervisor and the input option "3) messages" 308 remains highlighted. If the user wants to report an exception, the user can speak the command "exceptions" or speak the reference numeral "2" corresponding to the exceptions text command. Additionally, the user can speak the command "up," because the input option "2) exceptions" 306 is projected as one input option up above the input option "3) messages" 308 that is currently highlighted. Similarly, by speaking the command "down," the user can request status information because the input option "4) status" 310 is projected as one input option down below the currently highlighted input option "3) messages" 308.

The communication status 316 projects the status of communication inputs and outputs, such as whether speech input and speech output are enabled. If the sound meter 238 detects too much background noise, such that the speech engine 226 has difficulty with speech recognition from audio inputs, the mobile device 102 can temporarily disable speech input. If the user is having difficulty hearing outputs via the audio device 106, the user can request to temporarily disable speech output. When speech is temporarily disabled, subsequent inputs can still occur via the camera 110 and subsequent outputs can still occur via the transparent display 104. Based on the user's preferences, the user may have previously selected for some outputs to occur via the transparent display 104 and some outputs to occur via the audio device's 106 speaker 254. If the user temporarily disables speech, all outputs may occur via the transparent display 104, even outputs previously occurring via the audio device's 106 speaker 254.

Likewise, the intensity of the distribution center light detected by the camera 110 may be too bright for inputs via the camera 110 and outputs via the transparent display 104. The mobile device 102 can respond to the excessively bright light by conducting all subsequent inputs via the audio device's 106 microphone 210 and all subsequent outputs via the audio device's 106 speaker 254. When the background sound or the detected light returns to a level that enables the previous input and output selections, the mobile device 102 can either automatically revert to the selections or provide the user with the option of reverting to the selections.

Figure 4:
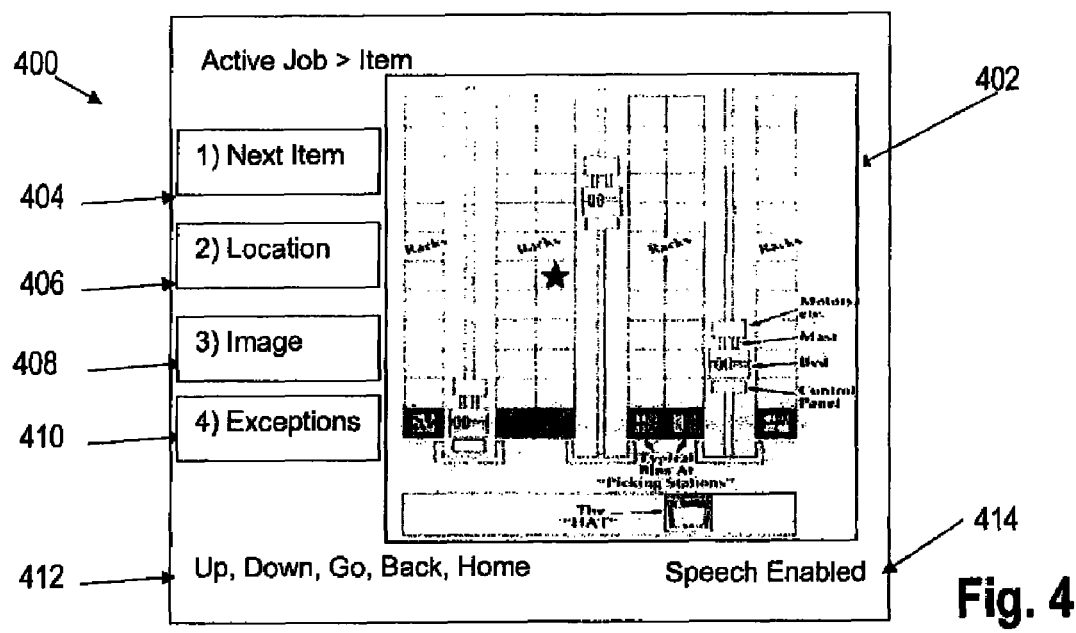
FIG. 4 shows another graphic user interface for determining an item location in a distribution center according to some embodiments of the present disclosure.

FIG. 4 shows another graphic user interface 400 for determining an item location in a distribution center according to some embodiments of the present disclosure. The graphic user interface 400 is projected on the transparent display 104, and can include a graphic output 402, input options 404 to 410, an input prompt 412, and a communication status 414. For example, the graphic output 402 can be a map of a distribution center that projects a star to inform the user of an item location.

The input options 404 to 410 can include "1) next item" 404, "2) location" 406, "3) image" 408, and "4) exceptions" 410. Each input option can be initiated by spoken commands, similar to the initiation of the spoken commands for the input options 304 to 312 described in FIG. 3. The input option "1) next item" 404 enables the user to select which item's location information will be projected next. The input option "2) location 406" enables the user to specify the type of item location information projected, such as text information, audio information, a map identifying the item location, or overlays identifying the item location. The input option "3) image" enables the user to request an image of the item to be projected on the transparent display 104 to assist the user in identifying the item. The input option "4) exceptions" is similar to the input option "2) exceptions" 306 in FIG. 3, and enables a user to report an exception at an item location, such as reporting that an item is out of stock at the location identified as the item location.

The input prompt 412 is similar to the input prompt 314 in FIG. 3, and projects text commands that the user can speak, such as "up, down, go, back, home." For example, when the user speaks "back," the mobile device 102 can respond by going back in the sequence of graphic user interfaces to output the previous graphic user interface 300. If the user speaks "home," the mobile device 102 can respond by projecting a graphic user interface that is designated as the initial or home user interface that is projected when the mobile device 102 is initiated for operation. The communication status 414 is similar to the communication status 316 in FIG. 3, and projects the status of communication input and outputs, such as whether speech input and speech output are enabled.

Figure 5:
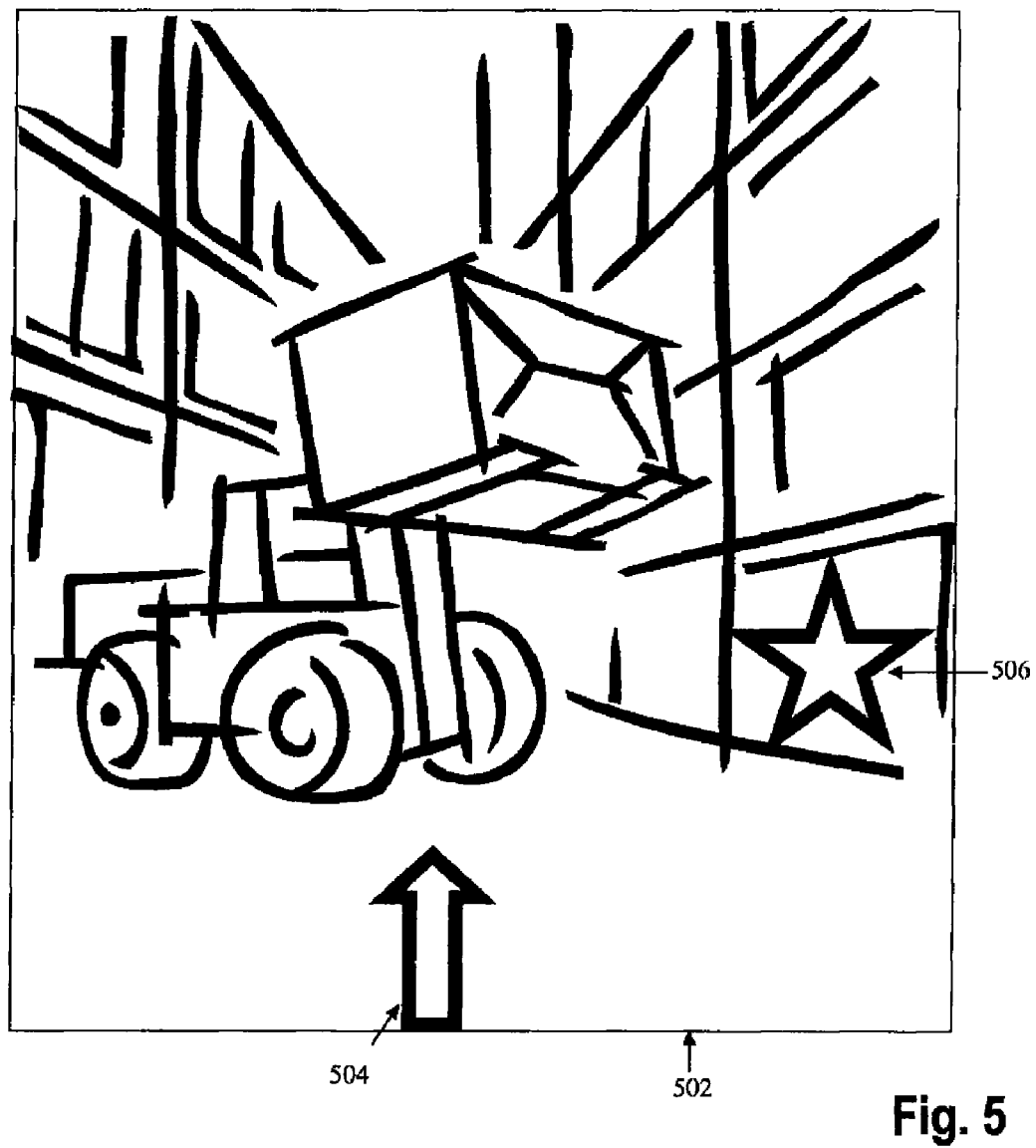
FIG. 5 shows yet another graphic user interface for determining an item location in a distribution center according to some embodiments of the present disclosure.

FIG. 5 shows yet another graphic user interface 502 for determining an item location in a distribution center according to some embodiments of the present disclosure. The graphic user interface 502 depicts a user's view through the transparent display 104. While the user is viewing a forklift lifting a box in an aisle of the distribution center, the mobile device 102 outputs an arrow 504 and a star 506 on the transparent display 104. The arrow 504 indicates the direction for the user to take to find the requested item. The arrow 504 is overlaid on the transparent display 104 to appear as if the arrow is on the floor of the aisle where the item is located. The star 506 indicates the location of the requested item. The star 506 is overlaid on the transparent display 104 to appear as if the arrow is on the requested item. The arrow 504 and the star 506 are used as illustrative examples, as the transparent display 104 can project other images to assist the user in locating a requested item. For example, the transparent display 104 can overlay the requested item with flashing green light, such that the requested item appears to be flashing green to the user.

Figure 6:
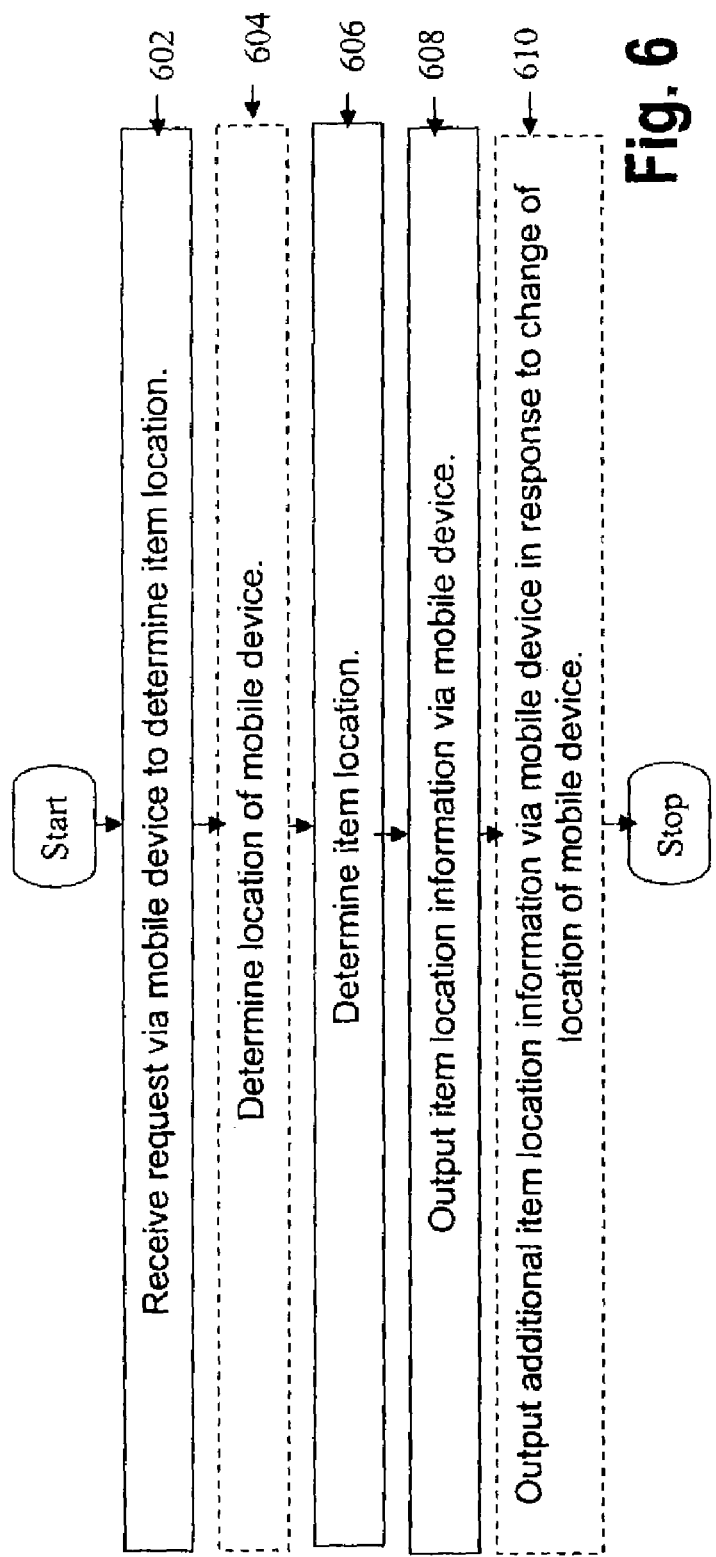
FIG. 6 shows a flowchart of a method for determining an item location in a distribution center according to some embodiments of the present disclosure.

FIG. 6 is a flowchart illustrating a method for determining an item location in a distribution center according to some embodiments of the present disclosure. The mobile device 102 can use the method to determine where to store or retrieve items in a distribution center.

In box 602, the mobile device receives a request to determine an item location. For example, the mobile device 102 can receive a request via the audio device's 106 microphone 210, the pointer 208, the keyboard 206, or the camera 110 to determine an item location. The mobile device 102 can use the speech engine 226 to execute speech recognition software for recognizing requests input via the audio device's 106 microphone 210. The mobile device 102 can also input requests submitted by the user's supervisor via the pointer 208 or the keyboard 206 that communicate with the supervisor's computer.

Additionally, the mobile device 102 can use the gestures engine 222 to execute gesture recognition software for recognizing images of gestures captured by the camera 110. For example, the gestures engine 222 can determine that the location of the user's index finger, as captured by the camera 110, is aligned with the location of an input option projected on the transparent display 104, such that to the user's perspective the user's index finger appears to be touching the projected input option. In this situation, which may occur when background noise is too loud for the speech engine 226 to accurately recognize speech commands, the gestures engine 222 enables the mobile device 102 to execute the input option identified by the user's index finger. The transparent display 104 can capture gestures by alternative means, such as by detecting a head nod by the individual wearing the transparent display 104, or any other motion detected by the mobile device 102.

In box 604, the mobile device optionally determines the location of the mobile device. For example, the mobile device 102 determines its location using at least one of a radio frequency identification technology, a global positioning system (GPS) technology, a forward link triangulation technology, a hybrid technology, and a motion detector technology. The mobile device 102 can determine its location, for example, using radio frequency identification technology by identifying electronic tags of nearby items in the distribution center, referencing the location database 248 to determine where these items are located in the distribution center, and fixing the location of the mobile device 102 in the distribution center based on the relationship between the locations of the mobile device 102 and the identified items. The identified items can be items stored in the distribution center, fixed electronic tags specifically used as beacons for determining relative location in the distribution center, or combinations of items and fixed electronic tags.

The mobile device 102 can use a global positioning system technology to fix the location of the mobile device 102. Global positioning system satellites transmit signals that are received by the mobile device 102. The mobile device 102 determines its position based on the different signals received from different satellites. The location accuracy is environment driven and dependant on the type of equipment used. The global positioning system technology is owned and operated by the U.S. Department of Defense, but is available for general use around the world.

The mobile device 102 can use forward link triangulation technology to determine its position based on the different radio frequency signals received from different cell towers, such as the cell tower 116 and other cell towers. In radio communications, a forward link is the link from a fixed location, such as the cell tower 116, to the mobile device 102. If the link includes a communications relay satellite, the forward link will consist of both an uplink from a base station to the satellite and a downlink from the satellite to the mobile device 102. Each serving cell tower broadcasts a system parameters information message to the mobile device 102. This message includes the longitude and the latitude of the serving cell tower. The radius covered by serving cell towers vary greatly, from hundreds of meters in dense urban areas to 20 miles or more in rural environments. The forward link triangulation technology fixes the location of the mobile device 102 based on measurements taken of time and distance signals from nearby cell towers. The mobile device 102 reports the time and distance measurements to the network 118, then the network 118 triangulates a location fix of the mobile device 102, and reports the location fix back to mobile device 102. In general, more than three surrounding cell towers are preferred to triangulate an optimal location fix.

The mobile device 102 can use a hybrid technology to fix the location of the mobile device 102 based on a combination of other location fix technologies. For example, if the mobile device 102 is indoors, but close to a window, the global positioning system technology in combination with a cell tower location technology can calculate the location fix for the mobile device 102. When the mobile device 102 is indoors, the mobile device 102 may receive signals from an insufficient number of satellites to determine the position of the mobile device 102. However, the hybrid technology can combine the signals from the insufficient number of satellites with the cell tower location identified by the channel length modulation to calculate a hybrid location fix for the mobile device 102.

The mobile device 102 can also use motion detector technology to fix the location of the mobile device 102. For example, the motion detector 102 fixes its location as the south end of aisle 5 in the distribution center based on forward link triangulation technology. If the motion detector 234, functioning as a pedometer, detects that the user of the mobile device 102 has walked 15 meters due north, the mobile device 102 combines the information from forward link triangulation technology and motion detector technology to fix the current location of the mobile device 102 as 15 meters north from the south end of aisle 5 in the distribution center.

In box 606, the mobile device determines the item location. For example, the mobile device 102 can determine the item location based on an electronic tag associated with an item or the location database 248 accessed on the content server 122. The item location can be expressed in absolute terms based on the location database 248, such as the graphic output 402 in FIG. 4 that identifies the item with a star on a warehouse map. The item location can also be expressed in relative terms based on the location engine 220, which can also process the location of the mobile device 102. An example of relative location is the star 506 in FIG. 5 that is projected on the transparent display 104 to produce an overlay in the line of sight between the user of the mobile device 102 and the requested item.

In box 608, the mobile device outputs item location information. For example, the mobile device 102 outputs the graphic user interface 400 in FIG. 4, which includes menu options, a map depicting the location for the item, and information regarding the item. The transparent display 104 can use the digital compass 214 to determine an orientation of the transparent display 104 such that the item location information can be based on the location of the item relative to the location of the transparent display 104. This item location information can be output to the transparent display 104 as text or converted to an audio signal and output to the audio device's 106 speaker 254. For example, the item location information can specify "walk 15 meters due north and the item will be on your right on the second shelf from the bottom."

The camera 110 can capture an image of the item to compare the captured image to stored images to assist a user in identifying the item. For example, the camera 110 captures an image of an item on the right side of the aisle in FIG. 5, and compares the captured image to stored images in the database 242 to identify the item as the requested item. The image may be a container or package for the item, general markings on the container or package, or specific markings on a consistently designated section of the container or package. In response to the identification, the mobile device 102 outputs an overlay of the star 504 to the transparent display 104 to identify the requested item to the user.

In box 610, the mobile device optionally outputs additional item location information in response to a change of location of the mobile device. The mobile device 102 can output the additional item location information automatically as the mobile device's 102 location changes, or in response to the user's requests for additional item location information. For example, the mobile device 102 outputs additional item location information in response to a change of the mobile device's 102 location, where box 604 describes how the mobile device's 102 location is determined. The mobile device 102 can use the mobile device's 102 location to provide updated information on the item location as the mobile device 102 approaches the item location. The updated item location information can be light projected on the transparent display 104, with the light changing based on the relative locations of the item and the transparent display 104. For example, the transparent display 104 projects the graphic output 402 map in FIG. 4 when the user is more than a certain distance from the requested item. When the user is less than the certain distance from the requested item, the transparent display 104 projects the graphic user interface 502 in FIG. 5. The arrow 504 continues to point northward in aisle 5 when the item is to the north of the transparent display 104. The arrow changes to an arrow that points due east when the transparent display's 104 location is due west of the item.

The mobile device 102 can output an audio signal to the audio device's 106 speaker 254, such that the audio signal changes based on the relative locations of the item and the mobile device 102. In this example, the audio signal can be beeps that increase in frequency as the mobile device 102 moves closer to the item and beeps that decrease in frequency as the mobile device 102 moves away from the item. Additionally, the mobile device 102 can output different colors of light to the transparent display 104, change the light to shades of green as the mobile device 102 moves closer to the item, and change the light to shades of red as the mobile device 102 moves away from the item.

When the user retrieves an item, the mobile device 102 can use the RFID reader 232 or images captured by the camera 110 to confirm that the user retrieved the requested item. The item locations information output to the transparent display 104 may include a map specifying an order for traveling to item locations. The map may be similar to the graphic output 402. For example, a user of the transparent display 104 is responsible for retrieving a computer, a monitor, and a keyboard from the shelves in a warehouse. The map output to the transparent display 104 may specify the order for traveling to the item locations based on the shortest distance for retrieving these items. For this example, the computer is located on a shelf in aisle 1, the monitor is located on a shelf in aisle 9, and the keyboard is located on a shelf in aisle 2. Retrieving the items in their listed order would result in the user traveling 8 aisles to retrieve the monitor after retrieving the computer, and traveling 7 aisles to retrieve the keyboard after retrieving the monitor, resulting in the user traveling a total of 15 aisles. After the system 100 identifies where each of the items are located on the shelves in the warehouse, the map specifies for the user to retrieve the computer in aisle 1, travel 1 aisle to retrieve the keyboard in aisle 2, and then travel 7 aisles to retrieve the monitor in aisle 9, resulting in the user traveling a total of only 9 aisles. Similar to the map specifying the shortest distance to retrieve items, a map output to the transparent display 104 may also specify the shortest distance for distributing items, which the user may follow when stocking the shelves of the warehouse.

Alternatively, the map may specify the order for traveling to the item locations based on an order for packing items. For example, if the computer must be packed in the bottom of a box, with the monitor packed in the middle of the box and the keyboard packed in the top of the box, the map may specify an order for traveling to the item locations that results in the retrieving the items based on the packing order. Likewise, the map may specify an order for traveling to locations based on an order for unpacking items. For example, the camera 110 may capture an image of a computer packed in the bottom of the box, a monitor packed in the middle, and a keyboard packed in the top of the box. In response to receiving this image of the items packed in the box, the map output to the transparent display 104 may specify that the user first distribute the keyboard to its item location the warehouse, then distribute the monitor to its item location in the warehouse, and finish by distributing the computer to its item location in the warehouse.

Because the user is retrieving items in the most efficient order through the distribution center, the user may have retrieved many items for different orders during one trip down an aisle. When the user approaches the distribution bins used for shipping the various retrieved items, the mobile device 102 can overlay each item with a color that matches the color overlaid on the corresponding distribution bin for each item. For example, the mobile device 102 can project purple overlays via the transparent display 104 on the retrieved items that are to be placed in a bin that is overlaid with purple via the transparent display 104. Likewise items that appear to the user to be green are for a distribution bin that appears to the user to be green, while items that appear to be orange are for a distribution bin that appears to be orange.

Figure 7:
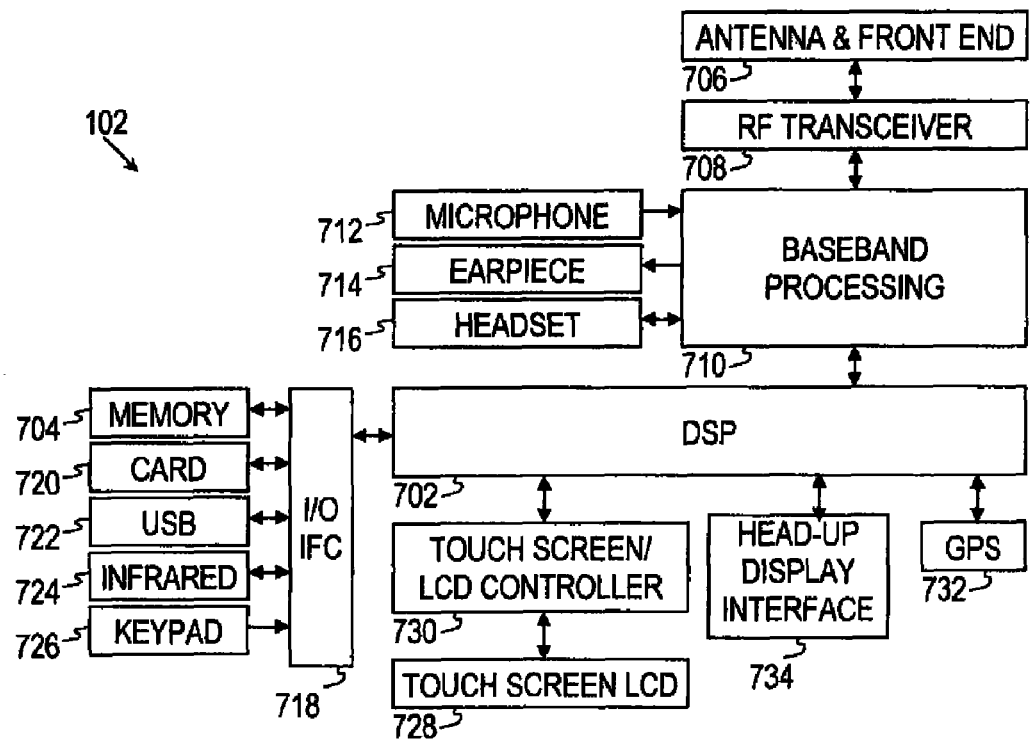
FIG. 7 shows a block diagram of an illustrative mobile device.

FIG. 7 shows a block diagram of the mobile device 102. The mobile device 102 includes a digital signal processor (DSP) 702 and a memory 704. As shown, the mobile device 102 may further include an antenna and front end unit 706, a radio frequency (RF) transceiver 708, a baseband processing unit 710, a microphone 712, an earpiece speaker 714, a headset port 716, an input/output interface 718, a memory card 720, a universal serial bus (USB) port 722, an infrared port 724, a keypad 726, a liquid crystal display (LCD) with a touch sensitive surface 728, a touch screen/LCD controller 730, a global positioning system (GPS) sensor 732, and a head-up display interface 734. In some contexts, the head-up display interface 734 may be referred to as a heads-up display interface.

The DSP 702 or some other form of controller or central processing unit operates to control the various components of the mobile device 102 in accordance with embedded software or firmware stored in the memory 704. In addition to the embedded software or firmware, the DSP 702 may execute other applications stored in the memory 704 or made available via information carrier media such as portable data storage media like the memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702 to execute the methods for the distribution center head-up display. In some contexts, the distribution center head-up display may be referred to as a distribution center heads-up display.

The antenna and front end unit 706 converts between wireless signals and electrical signals, enabling the mobile device 102 to send and receive information from a cellular network or some other available wireless communications network. The RF transceiver 708 may provide frequency shifting, e.g., converting received RF signals to baseband and converting baseband transmit signals to RF. The baseband processing unit 710 may provide channel equalization, decoding, and signal demodulation to extract information from received signals, and may code and modulate information to create transmit signals, and may provide filtering for signals. To that end, the baseband processing unit 710 includes ports for connecting to the built-in microphone 712 and the earpiece speaker 714 that enable the mobile device 102 to be used as a cell phone. The DSP 702 can also execute the baseband processing.

The DSP 702 can send and receive digital communications with a wireless network via the baseband processing unit 710. The input/output interface 718 interconnects the DSP 702 and various memories and interfaces. The memory 704 and the removable memory card 720 may provide software and data to configure the operation of the DSP 702. The infrared port 724 and other optional ports such as a Bluetooth interface or an IEEE 802.11 compliant wireless interface enable the mobile device 102 to communicate wirelessly with other nearby mobile devices 102 and/or wireless base stations. In some contemplated systems, the mobile device 102 is able to wirelessly exchange information at a point-of-sale when placed near a suitable transceiver.

The keypad 726 couples to the DSP 702 via the I/O interface 718 to provide one mechanism for the user to make selections, enter information, and otherwise provide input to the mobile device 102. Another input mechanism may be the touch screen display 728, which may also display text and/or graphics to the user. The display controller 730 couples the DSP 702 to the touch screen display 728.

The GPS sensor 732 is coupled to the DSP 702 to decode global positioning system signals, thereby providing at least one technology for the mobile device 102 to determine its location. Alternatively, GPS processing may be provided by a dedicated GPS chip or processor. The heads-up display interface 734 enables communication between the mobile device 102, the transparent display 104, the audio device 106, and the camera 110. Various other peripherals may also be included to provide additional functions, e.g., radio and television reception.

Figure 8:
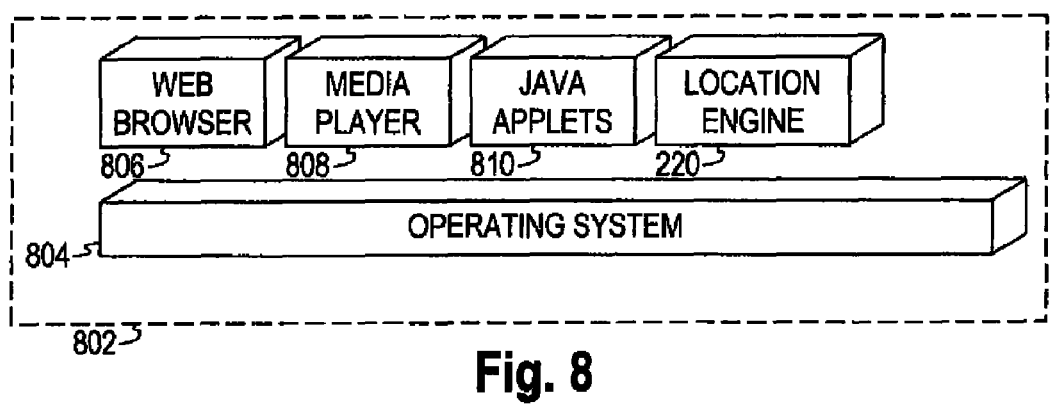
FIG. 8 shows a block diagram of an illustrative software configuration for a mobile device.

FIG. 8 illustrates a software environment 802 that may be implemented by the DSP 702. The DSP 702 executes operating system software 804 that provides a platform from which the rest of the software operates. The operating system generally provides processing resource management support. The operating system software 804 provides drivers for the mobile device hardware to make standardized interfaces available to application software. The operating system software 804 may transfer control between applications running on the mobile device 102. Also shown in FIG. 8 are a web browser 806 application, a media player 808, application JAVA applets 810, and a location engine 220 application. The web browser 806 application configures the mobile device 102 to operate as a web browser, allowing the user to enter information into forms and select links to retrieve and view web pages, including content from the content server 122. The media player 808 application configures the mobile device 102 to retrieve and play audio or audiovisual media on its own output components. The JAVA applets 810 may configure the mobile device 102 to provide games, utilities, and other functionality on the mobile device 102. These are further examples of content that may be provided by the content server 122. The location engine 220 application can execute a location fix technology for the mobile device 102.

Figure 9:
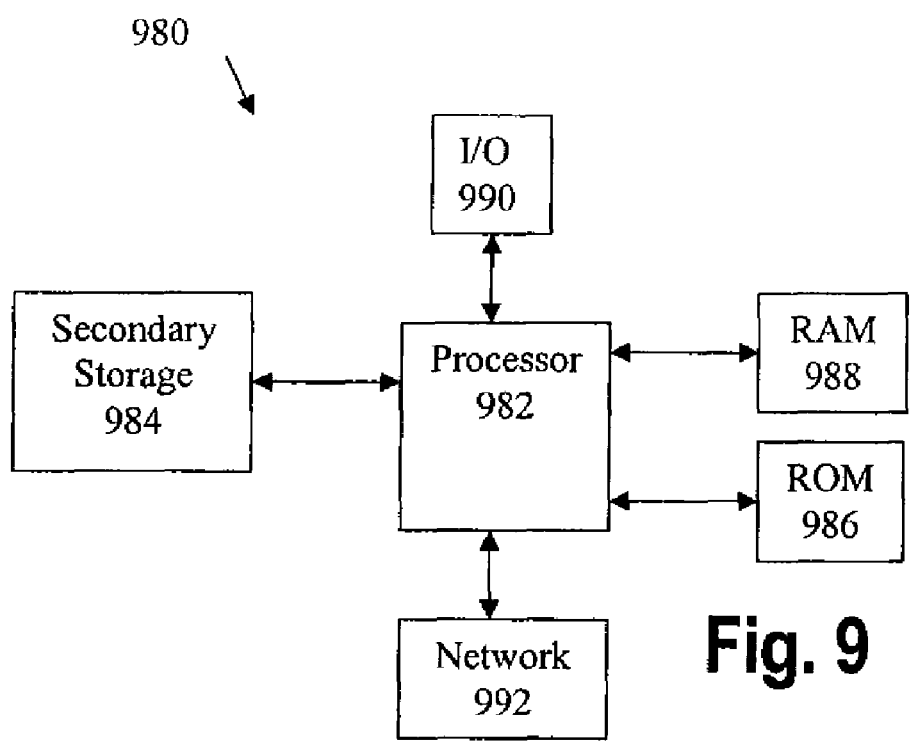
FIG. 9 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 9 illustrates a typical, general-purpose computer system, such as the content server 122, suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) 990 devices, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage. The RAM 988 is used to store volatile data and perhaps to store instructions. Access to both ROM 986 and RAM 988 is typically faster than to secondary storage 984.

I/O devices 990 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 992 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 992 may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for determining an inventory item location in a distribution center, comprising:
   an audio device;
   a transparent display;
   an identity information unit for gathering identity information about the inventory item; and
   a mobile device in communication with the audio device, the identity information unit, and the transparent display, wherein the mobile device is configured such that upon receipt of a request to determine the inventory item location within the distribution center from the audio device, the mobile device determines a location of the mobile device within the distribution center, the mobile device determines the requested inventory item location, and the mobile device outputs the requested inventory item location information to the transparent display, wherein the mobile device is configured such that, upon determining a change of the location of the mobile device, the mobile device outputs additional information to the transparent display, and wherein the mobile device is configured such that, upon nearing the inventory item location, the mobile device receives inventory item identity information from the identity information unit for at least one inventory item at the inventory item location and compares the inventory item identity information for the at least one of a plurality of inventory items to known identity information for the requested inventory item to verify that the at least one of the plurality of items is the requested inventory item.

2. The system of claim 1 wherein the transparent display comprises a user wearable lens and a projector to project images on the lens.

3. The system of claim 1, wherein the mobile device is further configured to output the inventory item location information to the audio device.

4. The system of claim 1, wherein the identity information unit comprises an electronic tag reader to identify inventory items.

5. The system of claim 1, wherein the mobile device determines the inventory item location based on at least one of an electronic tag associated with an inventory item and a location database.

6. The system of claim 1 wherein the mobile device is further configured to promote speech recognition.

7. The system of claim 1, wherein the identity information unit comprises a camera in communication with the mobile device, wherein the camera is configured to capture an image of the at least one inventory item at the inventory item location to promote comparing the captured image to stored images to assist a user to identify the requested inventory item.

8. The system of claim 7 wherein the mobile device is further configured to promote gesture recognition.

9. The system of claim 1, further comprising a digital compass to determine an orientation of the mobile device.

10. The system of claim 1, further comprising a server in communication with the mobile device, wherein the server is configured to access a database of inventory item locations for the mobile device.

11. The system of claim 1, wherein the mobile device is further configured to present a transparent graphic in the transparent display such that it appears to overlay the inventory item as viewed by the user indicating that the overlayed inventory item matches a requested inventory item when the comparison of the inventory item information matches the known inventory item information for the requested inventory item.

12. A method for determining inventory item locations in a distribution center, comprising:
   receiving a request to determine a plurality of inventory item locations within the distribution center for a plurality of orders;
   determining a location of a mobile device; determining the plurality of inventory item locations; outputting inventory item locations information via the mobile device based on the location of the mobile device, wherein the inventory item locations information comprises a map specifying an order for traveling to the inventory item locations, and wherein information specifies to which of the plurality of orders each of the inventory items belongs;
   receiving inventory item identity information when a user is less than a predefined distance from each of the inventory item locations; and
   comparing, by a processor, the inventory item identity information to known identity information for at least one of the plurality of inventory items requested by the user to determine whether the inventory item situated in the identified inventory item location matches one of the plurality of inventory items requested by the user.

13. The method of claim 12, wherein the map specifies the order for traveling to the inventory item locations based on at least one of a shortest distance for distributing inventory items and a shortest distance for retrieving inventory items.

14. The method of claim 12, wherein the map specifies the order for traveling to the inventory item locations based on at least one of an order for packing inventory items and an order for unpacking inventory items.

15. The method of claim 12, wherein inventory item locations information comprises at least one of menu options, a location for an inventory item, and information regarding the inventory item, and wherein receiving the request to determine the inventory item locations comprises receiving the request via at least one of a microphone, a pointer, a keyboard, and a camera.

16. The method of claim 12, further comprising:
   building inventory maps that associate the plurality of inventory items with the locations of the inventory items; and
   maintaining the inventory maps including associating new inventory items with the location of the new inventory items and updating the location of inventory items when the location of the inventory items change.

17. A method for determining an inventory item location in a distribution center, comprising:
- receiving a request via a mobile device to determine the inventory item location within the distribution center;
- determining a location of a mobile device; determining the inventory item location within the distribution center;
- outputting inventory item location information to a transparent display via the mobile device, wherein the inventory item location information is based on the inventory item location relative to the location of the mobile device; receiving inventory item identity information when less than a predefined distance from the inventory item location; and
- comparing, by a processor, the inventory item identity information to stored identity information for the inventory item to verify that the inventory item in the inventory item location is a correct inventory item.

18. The method of claim 17, wherein determining the location of the mobile device comprises determining the location of the mobile device relative to at least one of an inventory item with an electronic tag and a geographically fixed electronic tag using at least one of a radio frequency identification technology, a global positioning system technology, a forward link triangulation technology, a hybrid technology, and a motion detector technology.

19. The method of claim 17, wherein the item location information comprises light displayed on the transparent display, wherein the light changes based on the inventory item location relative to the location of the mobile device.

20. The method of claim 17, wherein the inventory item location information comprises an audio signal output to an audio device, wherein the audio signal changes based on the inventory item location relative to the location of the mobile device.

* * * * *